United States Patent
Chang et al.

(10) Patent No.: US 11,737,200 B2
(45) Date of Patent: *Aug. 22, 2023

(54) RESIDUAL GAIN MONITORING AND REDUCTION FOR EUV DRIVE LASER

(71) Applicant: Taiwan Semiconductor Manufacturing Co., Ltd., Hsin-Chu (TW)

(72) Inventors: Chun-Lin Louis Chang, Hsinchu County (TW); Jen-Hao Yeh, Hsinchu (TW); Han-Lung Chang, Hsinchu (TW); Tzung-Chi Fu, Miaoli (TW); Bo-Tsun Liu, Taipei (TW); Li-Jui Chen, Hsinchu (TW); Po-Chung Cheng, Chiayi County (TW)

(73) Assignee: TAIWAN SEMICONDUCTOR MANUFACTURING CO., LTD, Hsinchu (TW)

( * ) Notice: Subject to any disclaimer, the term of this patent is extended or adjusted under 35 U.S.C. 154(b) by 141 days.

This patent is subject to a terminal disclaimer.

(21) Appl. No.: 17/228,157

(22) Filed: Apr. 12, 2021

(65) Prior Publication Data

US 2021/0235572 A1    Jul. 29, 2021

Related U.S. Application Data

(63) Continuation of application No. 16/723,911, filed on Dec. 20, 2019, now Pat. No. 10,980,100, which is a
(Continued)

(51) Int. Cl.
*H05G 2/00* (2006.01)
*G21K 1/06* (2006.01)
(Continued)

(52) U.S. Cl.
CPC ............. *H05G 2/008* (2013.01); *G21K 1/062* (2013.01); *H01S 3/104* (2013.01); *H01S 3/1305* (2013.01); *H05G 2/005* (2013.01); *H01S 3/10038* (2013.01); *H01S 3/10069* (2013.01); *H01S 3/11* (2013.01); *H01S 3/134* (2013.01);
(Continued)

(58) Field of Classification Search
CPC ........ H05G 2/008; H05G 2/005; G21K 1/062; H01S 3/104; H01S 3/1305; H01S 3/10038; H01S 3/10069; H01S 3/11; H01S 3/134; H01S 3/2232; H01S 3/2316;
(Continued)

(56) References Cited

U.S. PATENT DOCUMENTS 8,144,740 B1 * 3/2012 Brown ................... H01S 3/225
                                                       372/55
8,547,525 B2   10/2013 Loopstra
(Continued)

*Primary Examiner* — David A Vanore
(74) *Attorney, Agent, or Firm* — Haynes and Boone, LLP

(57) ABSTRACT

A system includes a laser source operable to provide a laser beam, a laser amplifier having a gain medium operable to provide energy to the laser beam when the laser beam passes through the laser amplifier, and a residual gain monitor operable to provide a probe beam and operable to derive a residual gain of the laser amplifier from the probe beam when the probe beam passes through the laser amplifier while being offset from the laser beam in time or in path.

20 Claims, 13 Drawing Sheets

Related U.S. Application Data continuation of application No. 15/946,316, filed on Apr. 5, 2018, now Pat. No. 10,524,345.

(60) Provisional application No. 62/491,806, filed on Apr. 28, 2017.

(51) Int. Cl.
*H01S 3/13* (2006.01)
*H01S 3/104* (2006.01)
*H01S 3/23* (2006.01)
*H01S 3/11* (2023.01)
*H01S 3/223* (2006.01)
*H01S 3/134* (2006.01)
*H01S 3/10* (2006.01)

(52) U.S. Cl.
CPC .......... *H01S 3/2232* (2013.01); *H01S 3/2316* (2013.01); *H01S 3/2333* (2013.01); *H01S 3/2383* (2013.01)

(58) Field of Classification Search
CPC .... H01S 3/2333; H01S 3/2383; H01S 3/0014; G03F 7/70025; G03F 7/7055
See application file for complete search history.

(56) References Cited

U.S. PATENT DOCUMENTS

| | | |
|---|---|---|
| 8,604,452 B2 | 12/2013 | Ershov |
| 8,654,438 B2 | 2/2014 | Chang et al. |
| 8,764,995 B2 | 7/2014 | Chang et al. |
| 8,796,666 B1 | 8/2014 | Huang et al. |
| 8,828,625 B2 | 9/2014 | Lu et al. |
| 8,841,047 B2 | 9/2014 | Yu et al. |
| 8,877,409 B2 | 11/2014 | Hsu et al. |
| 9,093,530 B2 | 7/2015 | Huang et al. |
| 9,110,377 B2 | 8/2015 | Loopstra et al. |
| 9,184,054 B1 | 11/2015 | Huang et al. |
| 9,256,123 B2 | 2/2016 | Shih et al. |
| 9,380,691 B2 | 6/2016 | Tao et al. |
| 9,516,732 B2 | 12/2016 | Wagner et al. |
| 9,529,268 B2 | 12/2016 | Chang et al. |
| 9,548,303 B2 | 1/2017 | Lee et al. |
| 9,570,884 B2 | 2/2017 | Nowak et al. |
| 9,880,359 B2 | 5/2018 | Riggs et al. |
| 10,186,827 B2 | 1/2019 | Schulz et al. |
| 10,524,345 B2 * | 12/2019 | Chang .................... H05G 2/005 |
| 10,980,100 B2 * | 4/2021 | Chang .................... G21K 1/062 |
| 2005/0205811 A1 * | 9/2005 | Partlo ................. G03F 7/70033 250/504 R |
| 2008/0069157 A1 * | 3/2008 | Ariga .................... H01S 3/2308 372/21 |
| 2008/0087847 A1 * | 4/2008 | Bykanov ............ G03F 7/70033 250/504 R |
| 2011/0240890 A1 * | 10/2011 | Govindaraju .......... H05G 2/001 250/504 R |
| 2014/0300950 A1 | 10/2014 | Nowak et al. |
| 2014/0346375 A1 | 11/2014 | Nowak et al. |
| 2015/0351208 A1 | 12/2015 | Suganuma et al. |
| 2016/0172820 A1 | 6/2016 | Suganuma et al. |
| 2017/0070024 A1 | 3/2017 | Kawasuji et al. |
| 2018/0081280 A1 | 3/2018 | Schalgans et al. |
| 2018/0173117 A1 | 6/2018 | Chien et al. |
| 2018/0314145 A1 | 11/2018 | Chang et al. |
| 2018/0317308 A1 * | 11/2018 | Chang .................... H05G 2/005 |
| 2018/0375278 A1 | 12/2018 | Brunne et al. |
| 2019/0094717 A1 | 3/2019 | Yang et al. |
| 2020/0146137 A1 * | 5/2020 | Chang .................... G21K 1/062 |
| 2021/0235572 A1 * | 7/2021 | Chang .................... G21K 1/062 |

\* cited by examiner

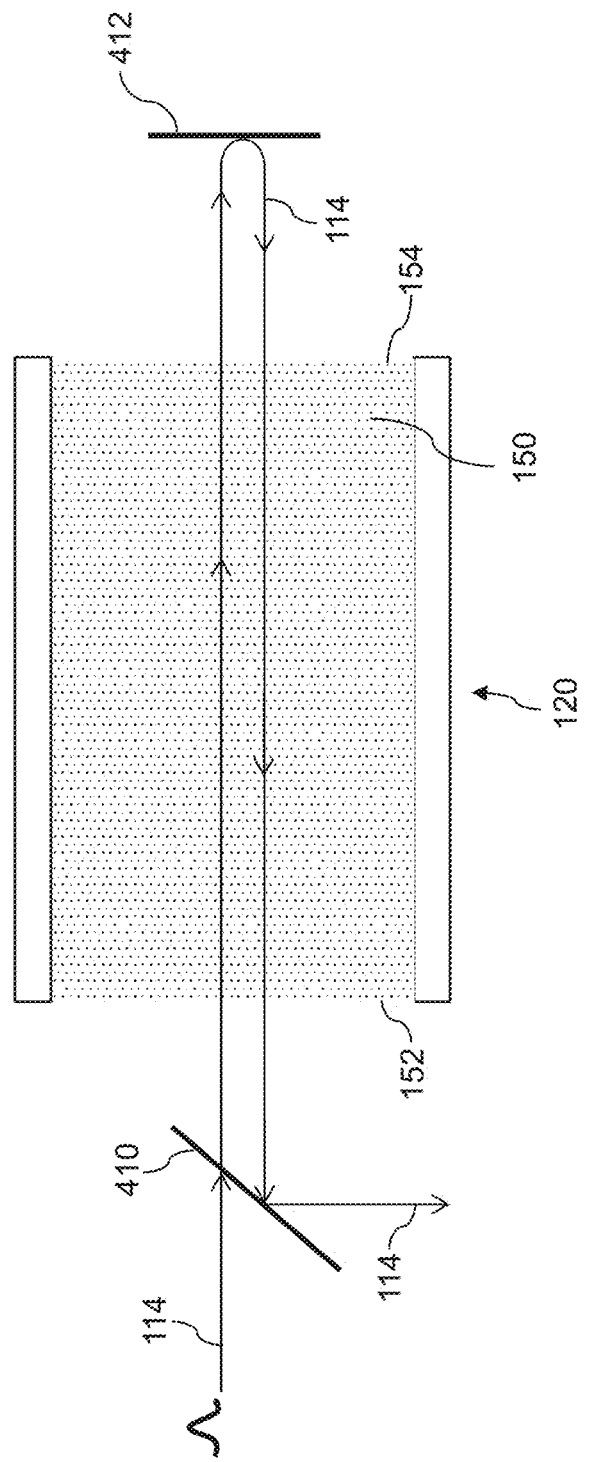

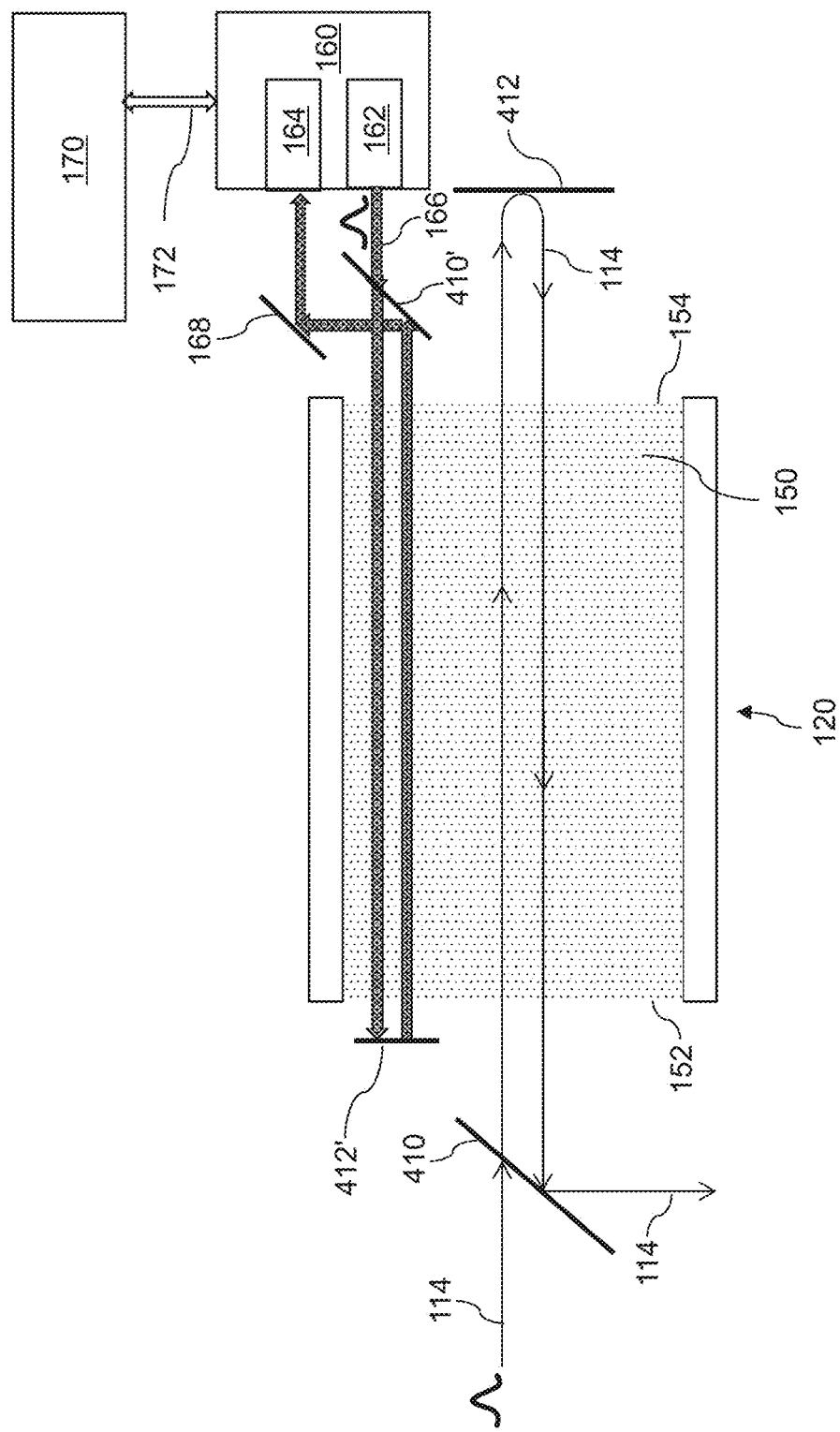

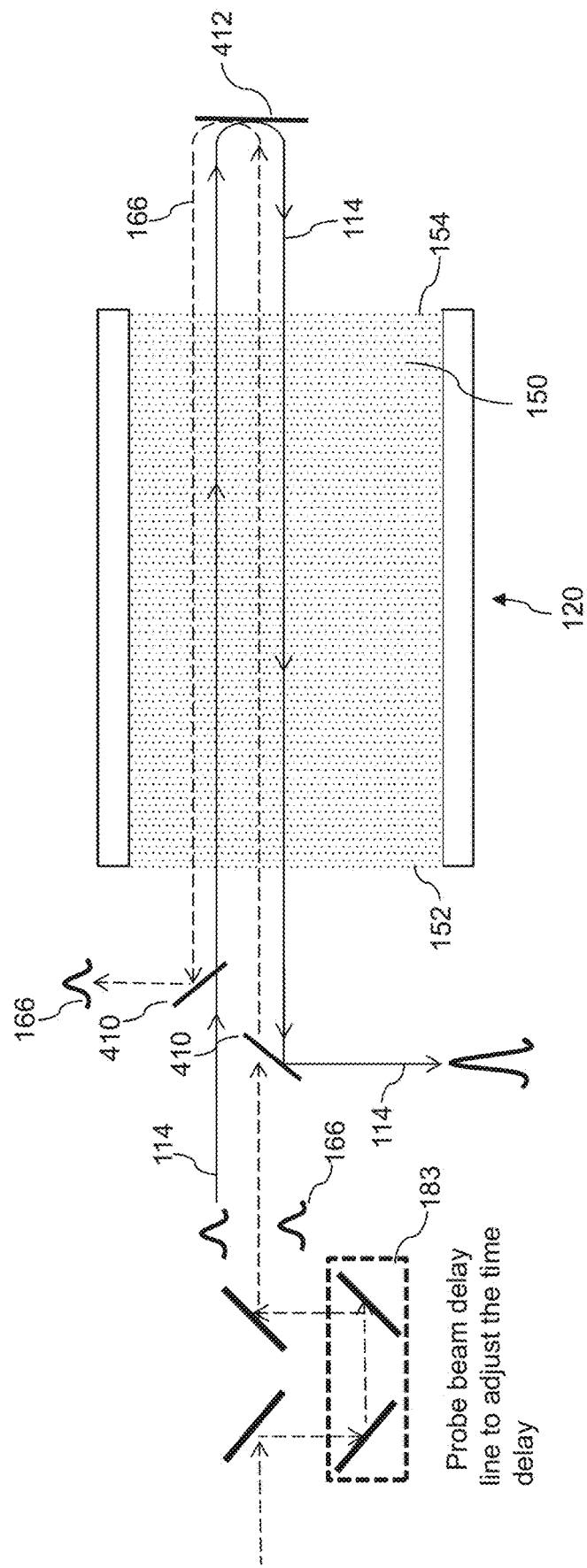

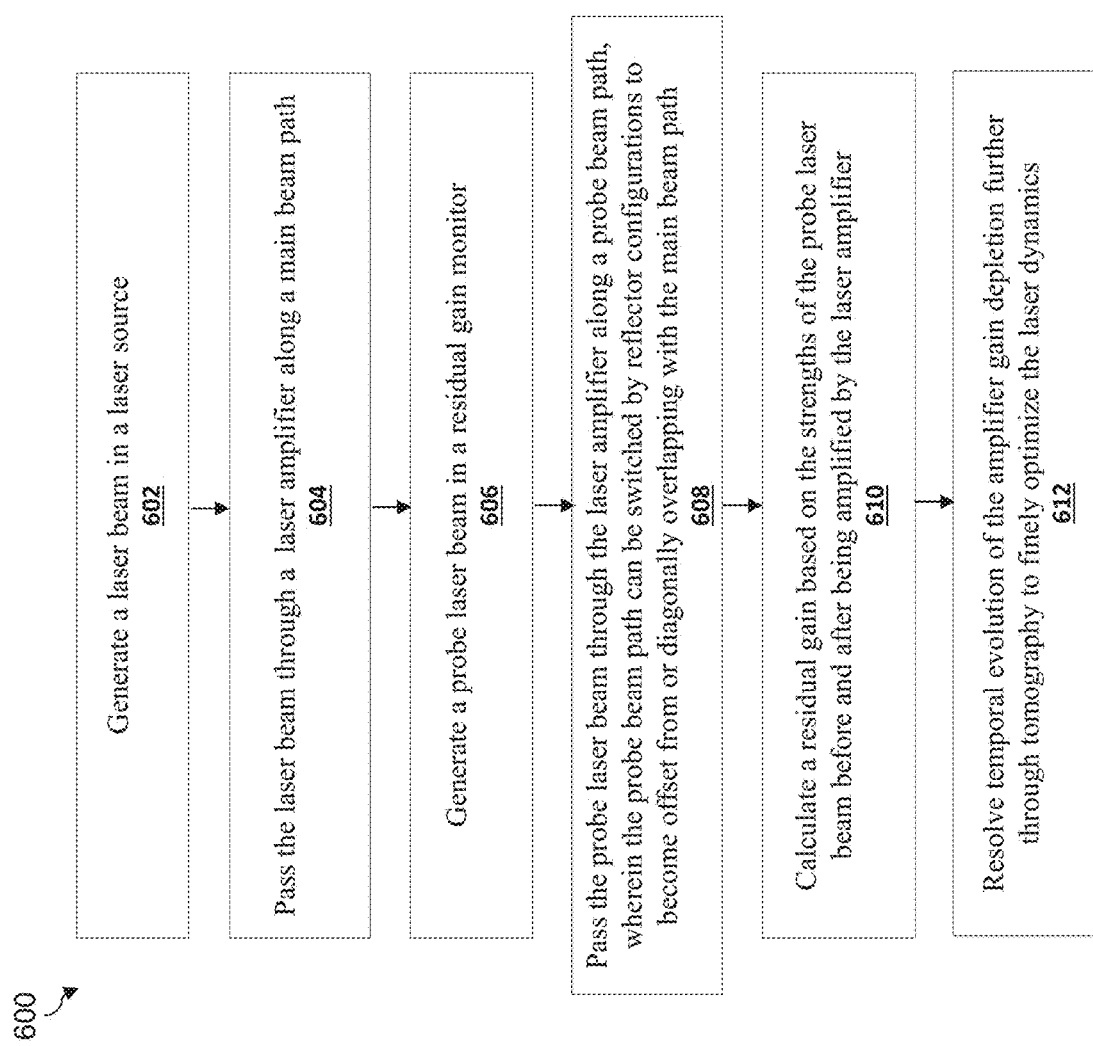

RESIDUAL GAIN MONITORING AND REDUCTION FOR EUV DRIVE LASER

PRIORITY

This application is a continuation application to U.S. patent application Ser. No. 16/723,911, filed on Dec. 20, 2019, and issued as U.S. Pat. No. 10,980,100, which is a continuation application to U.S. patent application Ser. No. 15/946,316, filed on Apr. 5, 2018, and issued as U.S. Pat. No. 10,524,345, which claims the benefits of U.S. Prov. App. No. 62/491,806 entitled "Residual Gain Monitoring and Reduction for Laser System," filed Apr. 28, 2017. Both these applications are herein incorporated by reference in their entirety.

BACKGROUND

The electronics industry has experienced an ever increasing demand for smaller and faster electronic devices which are simultaneously able to support a greater number of increasingly complex and sophisticated functions. Accordingly, there is a continuing trend in the semiconductor industry to manufacture low-cost, high-performance, and low-power integrated circuits (ICs). Thus far these goals have been achieved in large part by scaling down semiconductor IC dimensions (e.g., minimum feature size) and thereby improving production efficiency and lowering associated costs. However, such scaling has also introduced increased complexity to the semiconductor manufacturing process. Thus, the realization of continued advances in semiconductor ICs and devices calls for similar advances in semiconductor manufacturing processes and technology.

For example, semiconductor lithography processes may use lithographic templates (e.g., photomasks or reticles) to optically transfer patterns onto a substrate. Such a process may be accomplished by projection of a radiation source, through an intervening photomask or reticle, onto the substrate having a photosensitive material (e.g., photoresist) coating. The minimum feature size that may be patterned by way of such a lithography process is limited by the wavelength of the projected radiation source. In view of this, extreme ultraviolet (EUV) light sources and lithographic processes have been introduced. In addition, EUV lithographic processes may save manufacturing cost by avoiding a need to apply a multi-patterning technique in achieving minimum feature sizes.

However, generating the EUV light (or radiation) in EUV light generation systems can be an energy intensive and difficult process to control. As merely one example, a method to produce EUV light includes utilizing a laser system to generate a laser beam to irradiate a material that in turn radiates EUV light. After amplifying the laser beam, the laser system may still have residual energy left in its gain medium. Such residual energy can be harmful to the laser system when a portion of the laser beam is reflected along the laser beam path and travels back into the gain medium. The reflected laser beam in backward direction receives residual gain from the gain medium and gets amplified. The amplified reflected laser beam may generate extra heat that requires dissipation, or may become too strong in energy level and cause damages to optical components in the laser system. Moreover, the residual gain may induce self-lasing effect in amplifier chain to affect the temporal domain performance of laser pulses in forward direction, which may further affect a target material formation when laser pulses impinge on such target material, and in turn deteriorate the EUV generation. As such, there is a great deal of interests in tools and techniques capable of accurately monitoring residual gain and/or reducing residual gain in the laser system.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 4A, 4B, 4C, 4D, 4E, and 4F illustrate a laser amplifier with multi-pass amplifier configuration, in accordance with some embodiments.

FIG. 6 is a flow chart of a method for performing residual gain monitoring, in accordance with some embodiments.

DETAILED DESCRIPTION

Figure 1:
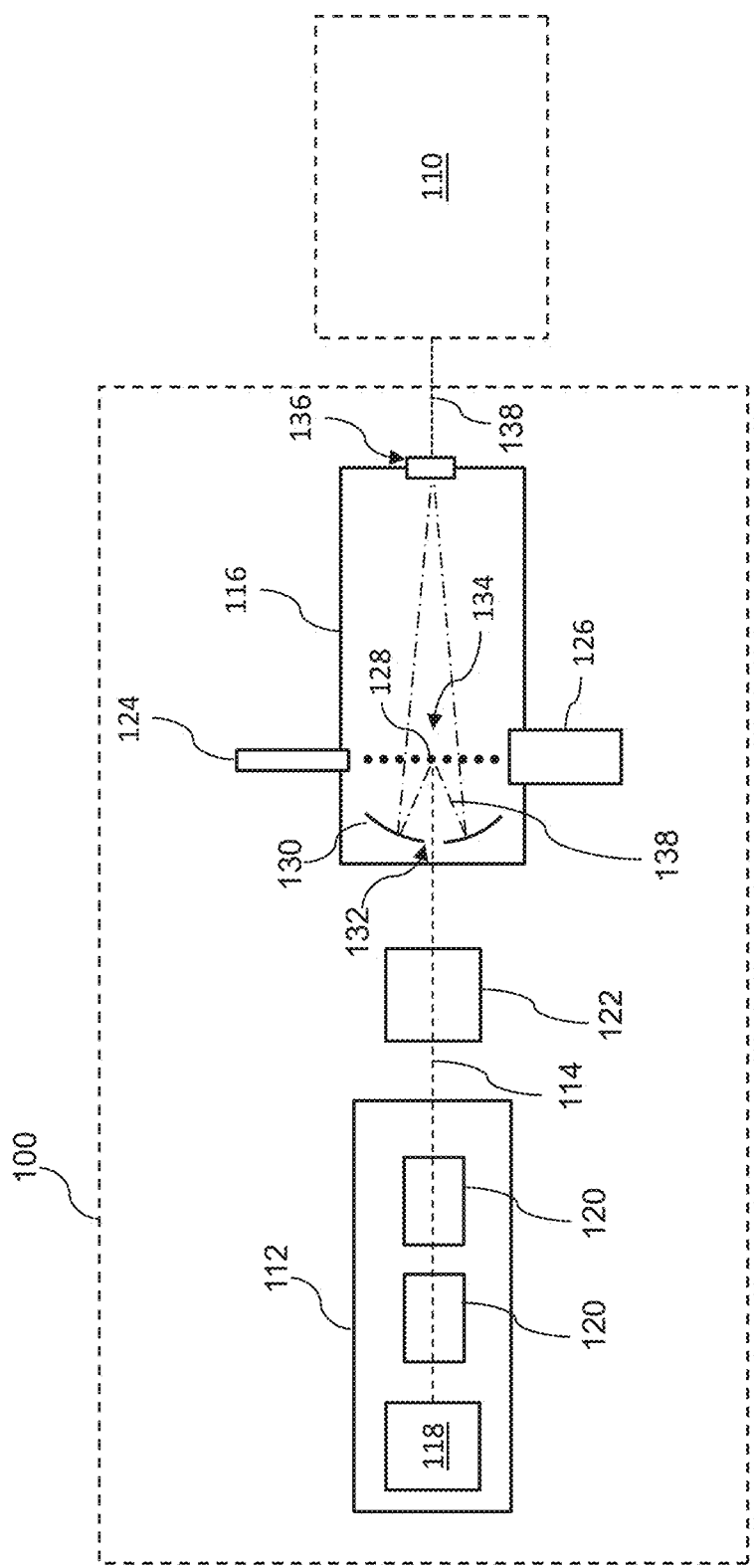
FIG. 1 is a schematic view of an EUV light (also referred to as EUV radiation) source system, including an exemplary laser system and an exemplary EUV vessel, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Additionally, throughout the present disclosure, the terms "mask", "photomask", and "reticle" may be used interchangeably to refer to a lithographic template, such as an EUV mask.

As the minimum feature size of semiconductor integrated circuits (ICs) has continued to shrink, there has continued to be a great interest in photolithography systems and processes using radiation sources with shorter wavelengths. In view of this, extreme ultraviolet (EUV) light sources, processes, and systems have been introduced. In addition, EUV lithographic processes may save manufacturing cost by avoiding a need to apply a multi-patterning technique in achieving minimum feature sizes. Methods to produce EUV light include, but are not necessarily limited to, converting a material into a plasma state that has an element (e.g., xenon, lithium, or tin) with an emission line in the EUV spectrum. In one such method, often termed laser produced plasma (LPP), the required EUV light can be produced by irradiating a target material, for example in the form of a droplet, with a laser beam emitted from a laser system. In accordance with its various embodiments, the present disclosure is generally related to metrology tools and techniques capable of monitoring residual gain in the laser system and methods of reducing such residual gain.

Referring to FIG. 1, illustrated therein is a schematic view of a EUV light generation system 100. The EUV light generation system 100 is illustrative of an exemplary system that creates EUV wavelength radiation, which can be delivered to a EUV lithography system 110, which will be further described later in FIG. 5. In some embodiments, a EUV light generation system 100 may include a laser produced plasma (LPP) EUV light source. Thus, as shown and in some embodiments, the EUV light generation system 100 may include a laser system 112 for generating and delivering a laser beam 114 to a EUV vessel 116.

The laser beam 114 may be a continuous beam or a series of pulses. In some embodiments, the laser beam 114 includes one or more main pulses, and/or one or more pre-pulses. Suitable lasers generated by the laser system 112 may include KrF, ArF, $CO_2$ lasers, solid-state laser, and other appropriate lasers. As an example, the laser system 112 may include a pulse laser device (e.g., a pulsed gas-discharge $CO_2$ laser device) producing a laser radiation at 9.2 um or 10.6 um, with DC or RF excitation, operating at a relatively high power (e.g., 20 KW or higher) and a high pulse repetition rate (e.g., 50 KHz or more).

In the illustrated embodiment, the laser system 112 has a master oscillator power amplifier (MOPA) configuration, which includes a master oscillator (MO) 118 as a seed laser source and multiple stages of power amplifiers (PA) 120. MOPA configuration can be used to not only optimize the amplification of a range of input parameters (e.g. laser pulse width, wavelength bandwidth etc.), but also amplify the input signal with both high gain and high efficiency in a laser system, as well as to control the input signal and its amplification in series separately, such that both the required input signal parameter and its amplification can be optimized. Using a master oscillator 118, for example, the high quality laser beam 114 with a pulse width short to 30 ns may be generated for extremely high-peak intensity at low pulse energy to drive EUV with higher conversion efficiency. Using power amplifiers 120 in a chain configuration, for example, the laser beam 114 can be further intensified efficiently, in order to deliver the power levels necessary for the high throughput. The master oscillator 118 is also referred to as the seed laser source 118. In a particular embodiment, the seed laser source 118 is a Q-switched or mode-locking laser source. The power amplifier 120 is also referred to as the laser amplifier 120. In a particular embodiment, the laser amplifier 120 is a RF pumped, fast axial flow, $CO_2$ laser amplifier.

In the EUV light generation system 100, the laser beam 114 may then be directed, by a beam transport and focus system 122, to the EUV vessel 116. The path along which the laser beam 114 travels through from the seed laser source 118 into the EUV vessel 116 is defined as the laser beam path. The chamber of beam path represented by the box 122 of FIG. 1 may include various devices to perform various functions including beam transport, beam focusing, beam amplification, and/or other suitable functionality.

In various embodiments, the EUV vessel 116 also includes a target generator 124 and a target catcher 126. In some cases, the target generator 124 is a droplet generator which provides target 128 in a form of droplets (such as tin or a tin compound, discussed further below) into the EUV vessel 116.

The EUV vessel 116 may include one or more optical elements such as a collector 130. In some embodiments, the collector 130 may include a normal incidence reflector, for example, implemented as a multilayer mirror (MLM). For example, the collector 130 may include a silicon carbide (SiC) substrate coated with a Mo/Si multilayer. In some cases, one or more barrier layers may be formed at each interface of the MLM, for example, to block thermally-induced interlayer diffusion. In some examples, other substrate materials may be used for the collector 130 such as Al, Si, or other type of substrate materials. The collector 130 may be an ellipsoid-shape with an aperture (or opening) 132 at the center to allow the laser beam 114 to pass through and reach an irradiation region 134. Thus, in some embodiments, the laser beam 114 passes through the aperture 132 of the collector 130 and irradiates droplets 128 generated by the droplet generator 124, thereby producing plasma at the irradiation region 134. In some embodiments, the collector 130 may have a first focus at the irradiation region 134 and a second focus at an intermediate focus region 136. By way of example, the plasma generated at the irradiation region 134 produces EUV light 138 collected by the collector 130 and output from the EUV vessel 116 through the intermediate focus region 136. From there, the EUV light 138 may be transmitted to an EUV lithography system 110 for processing of a semiconductor substrate. The generated EUV light 138 is an electromagnetic radiation having wavelengths of around 50 nm or less (also sometimes referred to as soft x-rays). In an embodiment, the EUV light 138 includes a wavelength centered around about 13.5 nm.

Figure 2A:
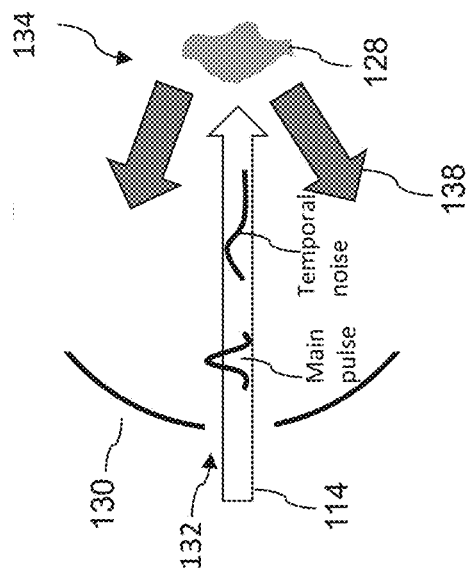
FIGS. 2A, 2B, and 2C are exemplary diagrammatic views of an EUV light source system including a laser beam impacting a droplet and generation of EUV light and a reflected laser beam therefrom, in accordance with some embodiments.

The interaction between the laser beam 114 and the target 128 is described in greater detail below with reference to FIGS. 2A and 2B. Referring to FIG. 2A, illustrated are diagrammatic view of portions of the EUV vessel 116, which provide further details that may be applied to the system of FIG. 1. FIG. 2A shows a diagrammatic view including the collector 130 and an entry of the laser beam 114 through the collector aperture 132 and incident upon a target 128 at the irradiation region 134. The target 128 may be the liquid droplet in spherical shape or the expanded mist in ellipsoidal shape. The material of the target 128 may include xenon, lithium, tin, indium, antimony, or tellurium, with an emission line in the EUV spectrum. In one embodiment, the target 128 may include tin or a tin compound. Example compositions include, but are not limited to, tin, SnBr4, SnBr2, SnH4, tin-gallium alloys, tin-indium alloys, tin-indium-gallium alloys or combinations thereof. The target 128 may have a diameter of approximately 10 um to 150 um. Through the amplification from multiple laser amplifiers 120, the laser beam 114 may have a power level ranging from about 10 KW to 40 KW, such as 26 KW in an example, before irradiating the target 128. Upon the irradiation, the material in the target 128 is converted by the laser beam 114 into a plasma state and emits EUV light, illustrated as the EUV light 138. It is noted that in an exemplary embodiment, the collector 130 may be approximately 24 inches in diameter with a 4 inch diameter aperture 132 in the center. The EUV light 138 may be angularly distributed such that it is incident upon the mirror surface of the collector 130. The EUV light 138 is further collected and focused by the collector 130 to a focal point, such as the focal region 136 in FIG. 1.

Figure 2B:
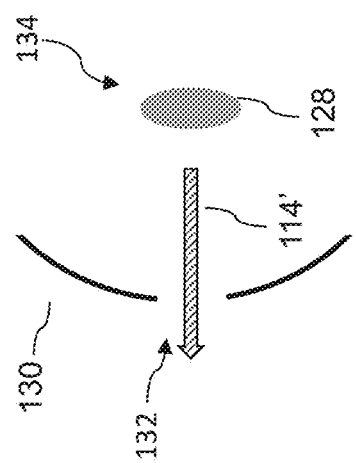
Figure 2C:
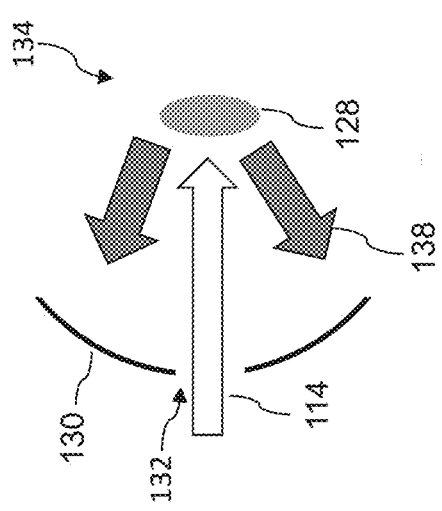

FIG. 2B illustrates that a portion of the laser beam 114 is also reflected back from the target 128, illustrated as the reflected laser beam 114'. The reflection in FIG. 2B may happen contemporaneously as the emitting of the EUV light 138 in FIG. 2A. The reflected laser beam 114' may travel along the laser beam path of the laser beam 114, but in an opposite direction. It may trace back to the laser system 112 through the aperture 132 and the beam transport and focus system 122 in FIG. 1. The residual energy remains in the laser amplifiers 120 may further amplify the reflected laser beam 114'. The gain (or referred as the amount of amplification) received by the reflected laser beam 114' from the laser amplifiers 120 is termed residual gain. In some embodiments, the residual gain may boost the amplified reflected laser beam 114' to a power level above 1 KW back to the master oscillator of the laser system 112, which can create thermal dissipation and/or stabilization issues. In various embodiments, there is a need to monitor and reduce the residual gain in the laser amplifiers 120 to avoid damages in the EUV light system and thereby free from EUV source downtime during a production, and also to maintain the target formation. Moreover, if the residual gain 120 goes beyond the specific lasing threshold in the laser amplifiers, a self-lasing may occur and contribute to the temporal noise at front foot of main pulse. This noise affects the target 128 formation right before the main pulse impinging on the target (e.g., a target 128 in irregular shapes), as shown on FIG. 2C.

It is noted that in FIGS. 2A and 2B, the target 128 is elliptical (also referred as a "pancake" shape) in the cross-sectional view. In other embodiments, the target 128 may be approximately spherical. The elliptical shape may be provided by introducing a pre-pulse of the laser (e.g., a $CO_2$ laser) from the seed laser source 118 prior to the introduction of a main-pulse of the laser beam 114. The pre-pulse may be used to shape the target 128 increasing the available surface area for impact with a subsequent main pulse of the laser beam 114.

Figure 3A:
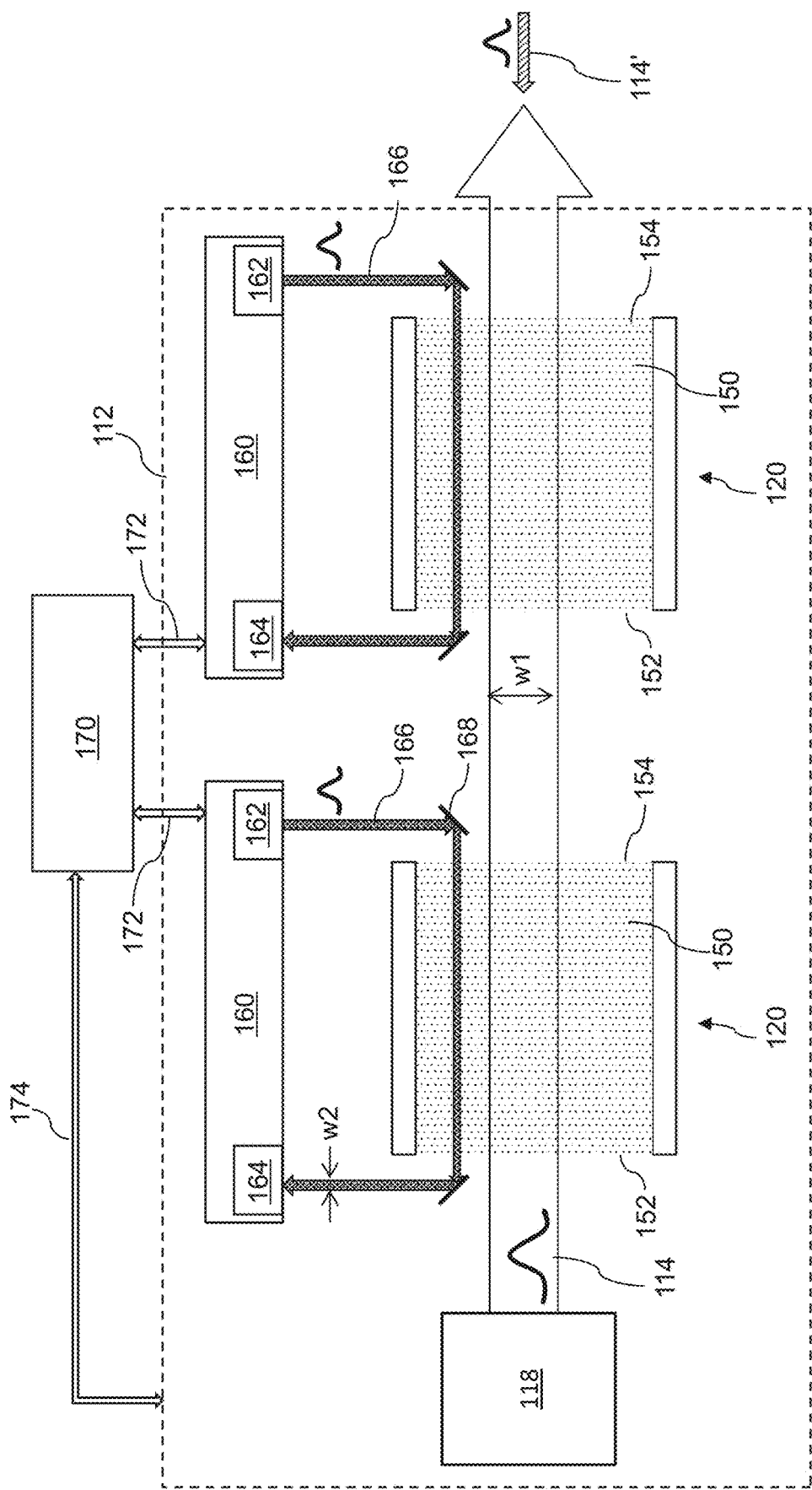
FIGS. 3A, 3B, and 3C illustrate a laser system with metrology apparatus for residual gain monitoring, in accordance with some embodiments.

A laser system with metrology tool for monitoring residual gain of its laser amplifiers is described in detail below with reference to FIGS. 3A, 3B, and 3C. Referring to FIG. 3A, illustrated is a schematic view of the laser system 112, which provides further details of the EUV light generation system 100 of FIG. 1. The laser system 112 includes the seed laser source 118 and one or more laser amplifiers 120 as discussed above in FIG. 1. In the illustrated embodiment, two laser amplifiers 120 are provided for illustration purposes and do not necessarily limit the embodiments of the present disclosure to any number of laser amplifiers 120. Further, although not shown, it should be recognized by one of ordinary skill in the art that various other elements can be included in a laser system, such as optical components and electronic control circuits.

Each laser amplifier 120 includes a gain medium 150. The laser beam 114 enters the gain medium 150 from an input port 152 of the laser amplifier 120 and exits from an output port 154. The gain medium 150 can amplify the power of (i.e., provide gain to) a laser beam passing through it. In order to amplify a laser beam, the gain medium must be in a nonthermal energy distribution known as a population inversion. The preparation of this state requires an external energy source and is known as laser pumping. The gain results from the stimulated emission of gain medium composition's transitions to a lower energy state from a higher energy state previously populated by the laser pumping. Depending on the types of the laser amplifier, compositions of the gain medium 150 may include crystals doped with rare-earth ions or transition metal ions, silicate or phosphate glasses, mixtures of gases, semiconductors, or liquids in the form of dye solutions.

In the illustrated embodiment, the laser amplifier 120 is a $CO_2$ laser amplifier based on a gas mixture as the gain medium 150, which may contain $CO_2$, He, $N_2$, and possibly some $H_2$, water vapor, and/or Xe. A $CO_2$ laser amplifier can be electrically pumped via a gas discharge, which can be operated with DC current, AC current (e.g., 20-50 kHz), or radio frequency (RF) energy. $N_2$ molecules are excited by the discharge into a metastable vibrational level and transfer their excitation energy to the $CO_2$ molecules when colliding with them. He molecules serve to depopulate the lower laser level and to remove the heat. Other constituents such as $H_2$ or water vapor can help (particularly in sealed-tube laser amplifiers) to reoxidize carbon monoxide (formed in the discharge) to carbon dioxide. In one embodiment, the gas mixture has a ratio of $CO_2$:He:$N_2$ about 5%:80%:15%.

The laser beam 114 has a beam width $w_1$. The laser beam 114 along the beam path may not have sharp edges, but usually has certain distribution in a transverse plane, such as a Gaussian distribution. The beam width $w_1$ of the laser beam 114 is herein defined as the distance between two positions in a plane perpendicular to the beam axis where the laser intensity drops to a pre-defined level of the value on the beam axis, such as when a marginal distribution drops to $1/e^2$ (about 13.5%) times the maximum value. The beam path of the laser beam 114 is also considered to have the same width $w_1$ with the laser beam 114. The value of the beam width $w_1$ may change along the beam path, for example, when the laser beam 114 passes some optical components and causes the distribution in the transverse plane changed.

The gain in the gain medium 150 is consumed (or attenuated) after energy has been provided to amplify the laser beam 114. However, there may be substantial energy remains in the gain medium 150, as residual energy. When the reflected laser beam 114' (reflected from the EUV vessel 116 and/or other portions of the laser beam 114 reflected at interfaces between various optical components along the beam path), travels back into the gain medium 150, the residual energy provides residual gain to the reflected laser beam 114'. To monitor the residual gain, the laser system 112 further has one or more residual gain monitors 160 coupled to the laser amplifiers 120.

Still referring to FIG. 3A, in the illustrated embodiment, each laser amplifier 120 is coupled to a residual gain monitor 160. The residual gain monitor 160 has an emitter 162 and a receiver 164. A probe laser beam 166 is transmitted from the emitter 162, which enters the laser amplifier 120 from the output port 154 and exits from the input port 152, and received by the receiver 164. Along the beam path of the probe laser beam 166, there may be several reflectors 168 that help guide the probe laser beam 166 into the laser amplifier 120. For the sake of clarity, the beam path of the laser beam 114 is referred to as the main beam path, and the beam path of the probe laser beam 166 is referred to as the probe beam path. The probe beam path has a width $w_2$ associated with a distribution of the probe laser beam 166 in a transverse plane. The probe beam path may be parallel to (FIG. 3A) or diagonally cross (FIG. 3B) the main beam path inside the respective laser amplifier 120. The probe laser beam 166 may be generated by continuous or pulsed lasers.

Both pulse energy and average power of the probe laser beam 166 is selected at the level far less than amplifier saturation energy and power, respectively, such that the probe laser beam 166 would not substantially change the residual gain in the gain medium 150, even after being amplified. In some embodiments, the probe laser beam 166 has a power level ranging from about 1 uW to about 1 mW and an energy level ranging from about 1 nJ to about 1 uJ before entering the respective laser amplifier 120. In some embodiments, the probe laser beam 166 has a power level ranging from has a power level ranging from $10^{-9}$ to $10^{-6}$ of a power level of the laser beam 114 and an energy level ranging from $10^{-6}$ to $10^{-3}$ before both entering the respective laser amplifier 120. After traveling through the laser amplifier 120, the probe laser beam 166 is amplified by the residual energy that remains in the gain medium 150. By comparing the amount of amplification, the residual gain monitor 160 measures a residual gain of the probe laser beam 166. The residual energy in the gain medium 150 may have a distribution. The residual gain of the probe laser beam 166 may not necessarily be the same as the residual gain of the reflected laser beam 114'. For example, if the probe beam path is offset from the main beam path in the gain medium 150 as shown in FIG. 3A. By associating a known or estimated distribution of the residual energy and the measured residual gain of the probe laser beam 166, the residual gain monitor 160 may calculate (or predict) the residual gain of the reflective laser beam 114' (also referred to as the residual gain of the laser amplifier).

Each residual gain monitor 160 is coupled to a control module 170 through a communication line 172. The communication line 172 may be a direct wire connection, or include a bus, such as an Inter-integrated Circuit ($I^2C$) bus, a Serial Peripheral Interface (SPI) bus, or a Universal Asynchronous Receiver Transmitter (UART) bus. The control module 170 retrieves residual gain information from the residual gain monitors 160 and may compare it to a threshold level. The control module 170 is further coupled to the laser system 112 through a control signal line 174. If residual gain from one of the laser amplifiers 120 is too high, the control module 170 can adjust parameters of the respective gain medium 150 to lower the residual gain, such as by reducing the strength of the laser pumping or missing target to terminate EUV generation by shifting the time delay between laser pulse and moving target.

As illustrated in FIG. 3A, the probe beam path may not overlap with the main beam path in the gain medium 150. Therefore, the laser beam 114 (and/or the reflected laser beam 114') and the probe laser beam 166 may propagate inside the laser amplifier 120 simultaneously without interfering with each other, which allows the residual gain to be monitored on the fly.

Figure 3B:
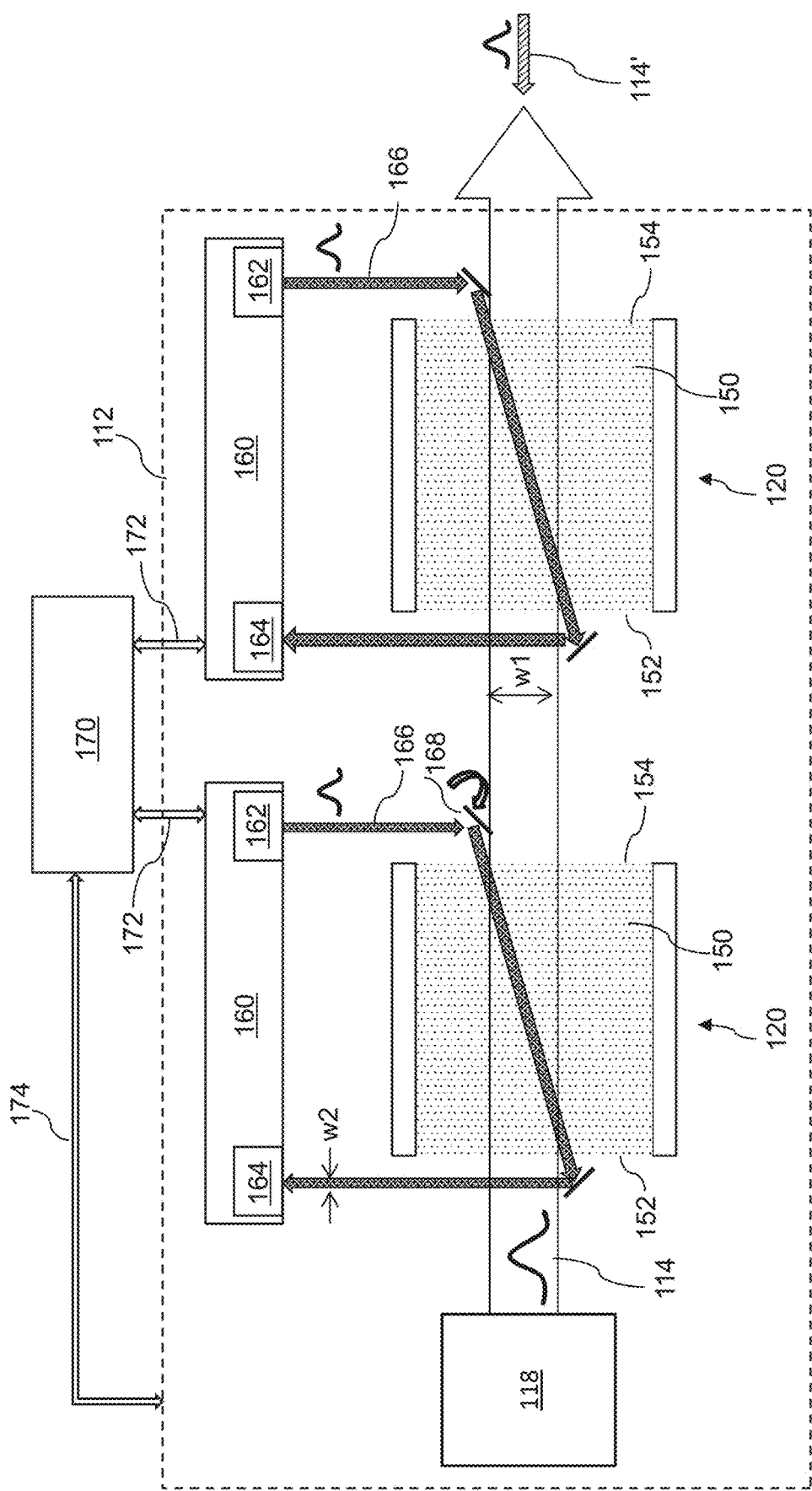

Referring to FIG. 3B, the probe beam path may overlap with the main beam path in the gain medium 150 in some embodiments. In furtherance of these embodiments, the probe beam path is overlapped with the main beam path through diagonally crossing by just rotating the input mirror of probe beam. In another embodiment, the reflectors 168 are reconfigurable, allowing the probe beam path to be either offset from the main beam path or diagonally crossing the main beam path in one apparatus, before or during transmitting the main beam. In yet another embodiment, the probe beam path and the main beam path are co-axial. The probe laser beam 166 is transmitted into the gain medium 150 during a time period when there are no other laser beams inside the gain medium 150. For example, the laser beam 114 being a series of laser pulses, after a laser pulse exits the gain medium 150, and before a reflected laser pulse 114' enters the gain medium 150, the probe laser beam 166 is transmitted as a probe laser pulse 166 into and travels through the gain medium 150. Since the probe beam path overlaps with the main beam path, the measured residual gain of the probe laser beam 166 may be considered as the residual gain of the laser amplifier 120.

In various embodiments, the number of residual gain monitors 160 may be less than the number of laser amplifiers 120. In some embodiments, the laser amplifier 120 positioned in the last stage along the main beam path provides the largest power increment to the laser beam 114 but with the smallest gain (also known as a power stage), while the first few laser amplifiers 120 closer to the seed laser source 118 provide smaller power increment to the laser beam 114 but much larger gain (also known as pre-amplify stages). In such a scenario, the laser amplifier 120 positioned in the last stage may not need a residual gain monitor 160 for residual gain monitoring, as the residual gain at this stage may be much lower than a threshold level. In some embodiments, the laser system 112 may have just one laser monitor 120 to monitor the residual gain of the first laser amplifier 120 positioned next to the seed laser source 118, which may have the largest residual gain among the laser amplifiers 120. In alternative embodiments, the laser system 112 may have just one residual gain monitor 120, while the residual gain monitor emits the probe laser beam 166 into the output port 154 of the last laser amplifier 120 positioned in the main beam path and collects the probe laser beam 166 from the input port 152 of the first laser amplifier, thereby monitoring the residual gain of all the laser amplifiers 120 as a whole.

Figure 3C:
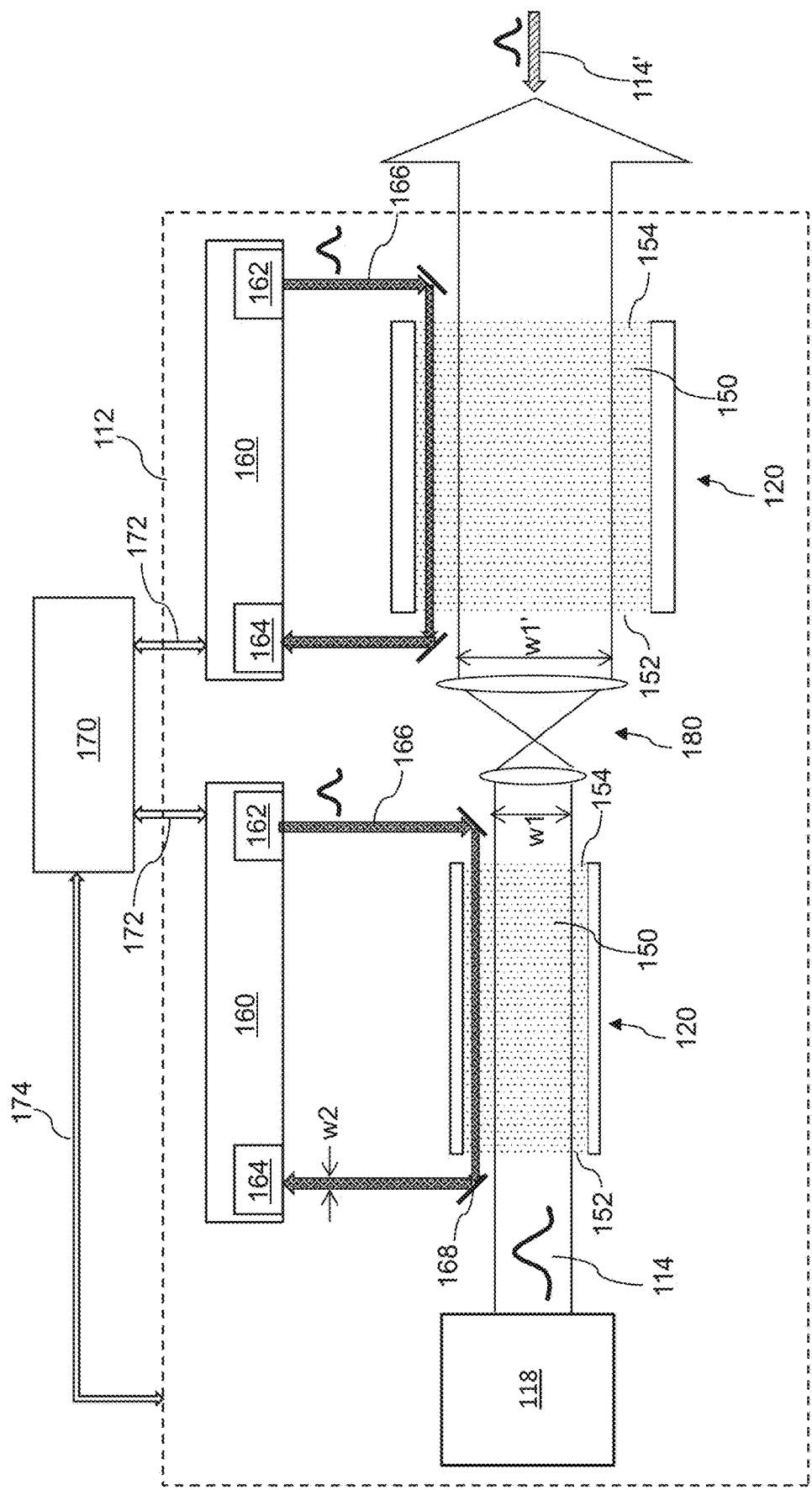

FIG. 3C illustrates some embodiments of the laser system 112 with multiple laser amplifiers 120 in different gain medium sizes. Specifically, cross-sectional areas of the gain medium 150 of multiple laser amplifiers 120 are enlarged gradually along the propagation direction of the laser beam 114. Meanwhile, the beam width of the laser beam 114 is also enlarged when traveling from one gain medium into another (e.g., from $w_1$ to $w_1'$ as illustrated in FIG. 3C) for higher amplifier saturation energy stage by stage. The beam width enlargement can be implemented by inserting a beam-shaping optics 180 (e.g., a telescopic beam expander) between two laser amplifiers 120. In some embodiments, the gain medium 150 is in a tube shape, and the ratio of the beam width enlargement $w_1'/w_1$ is the same as the ratio of the radius enlargement of the respective two gain mediums 150. In some embodiments, the beam width of the laser beam 114 is tuned to match the radius of the gain medium 150 in each stage, leaving smaller areas outside of the main beam path in a gain medium. Since energy stored in areas outside of the main beam path in a gain medium may contribute to a major portion of the residual energy, by matching the main beam width $w_1$th the cross-sectional size of the gain medium, areas outside of the main beam path in a gain medium are reduced. In turn, less residual energy remains in those areas and the residual gain in the gain medium is thereby reduced. In a specific example, the laser gas tube size of the first laser amplifier 120 (pre-amplify stage) has a diameter of about 25 mm, and the ratio of the tube size along a 4-stage MOPA is about 1:1:1.3:1.5. Furthermore, the output beam size may have a diameter of about 20 mm, and the ratio of beam size along the 4-stage MOPA is about 1.3:1:1.13:1. Optionally, each laser amplifier 120 may also include a residual gain monitor 160 for residual gain monitoring. The probe beam path may overlap with (e.g., diagonally overlap as illustrated in FIG. 3B) or be co-axial with the main beam path, or be offset from the main beam path (e.g., offset as illustrated in FIG. 3A and FIG. 3C). In another embodiment, the probe beam path in the first laser amplifier 120 is offset from the main beam path and the probe beam path in the second laser amplifier 120 diagonally overlaps with the main beam path, or vice versa, for example, to accommodate the placement of reflectors 168 on both sides of the main beam.

A laser system with a multi-pass amplifier configuration capable of reducing residual gain is described in detail below with reference to FIGS. 4A-4F. The laser amplifier illustrated in FIGS. 4A-4F is similar to the ones in FIG. 1 and FIGS. 3A-3C in various aspects. Therefore, reference numerals are repeated to show the same or similar components in the illustrated embodiments. Furthermore, some descriptions of the same or similar components in FIGS. 4A-4F are abbreviated or omitted by referring to the descriptions above in FIG. 1 and FIGS. 3A-3C for the sake of simplicity.

FIG. 4A illustrates an exemplary laser amplifier 120 with a multi-pass amplifier configuration. In a multi-pass amplifier configuration, a laser beam output from a laser amplifier makes at least two separate passes through the gain medium of the laser amplifier. The use of at least one additional pass can allow for an increase in gain extraction, and can provide the ability to obtain higher output laser beam energy with a lower input energy requirement with the same RF pumping to drive EUV generation. Such a configuration can also be used to drive the laser amplifier into a state of saturation, thereby reducing pulse-to-pulse energy fluctuations and improving beam homogeneity, in spite of reducing the number of laser amplifier along MOPA. Furthermore, the at least one additional pass can bring away additional energy from the gain medium, resulting in less residual energy remaining after the laser beam has passed through, and thereby reducing residual gain of the laser amplifier.

In the illustrated embodiment, the laser amplifier 120 has a polarization beam splitter 410 in front of the input port 152 and a retro-reflector 412 after the output port 154. The polarization beam splitter 410 allows a laser beam's polarization components in a direction (e.g., in a horizontal direction) to pass through, while reflects other polarization components perpendicular to that direction (e.g., in a vertical direction). In the illustrated embodiment, the laser beam 114 has horizontal polarization, which allows it to pass the polarization beam splitter 410 and travel through the gain medium 150 in a first pass until reaching the retro-reflector 412. The retro-reflector 412 reflects the laser beam 114 back to the gain medium 150. The retro-reflector 412 further changes the polarization of the laser beam 114 by 90°, for example, by using a quarter wave plate. After the reflection, the laser beam 114 travels back into the gain medium in a second pass with a vertical polarization until reaching the polarization beam splitter 410 from another side. Since the laser beam 114 in the first pass and the laser beam 114 in the second passes have perpendicular polarizations, they do not interfere with each other. Subsequently, the polarization beam splitter 410 reflects the laser beam 114 in the vertical polarization to the next laser amplifier 120.

Since the laser beam 114 passes the laser amplifier 112 twice, the laser amplifier 120 in such a configuration is also referred to as a dual-pass laser amplifier 120. In some embodiments, the laser amplifier 120 may include extra sets of polarization beam splitter and retro-reflector to allow the laser beam to pass the gain medium more than twice.

Figure 4B:
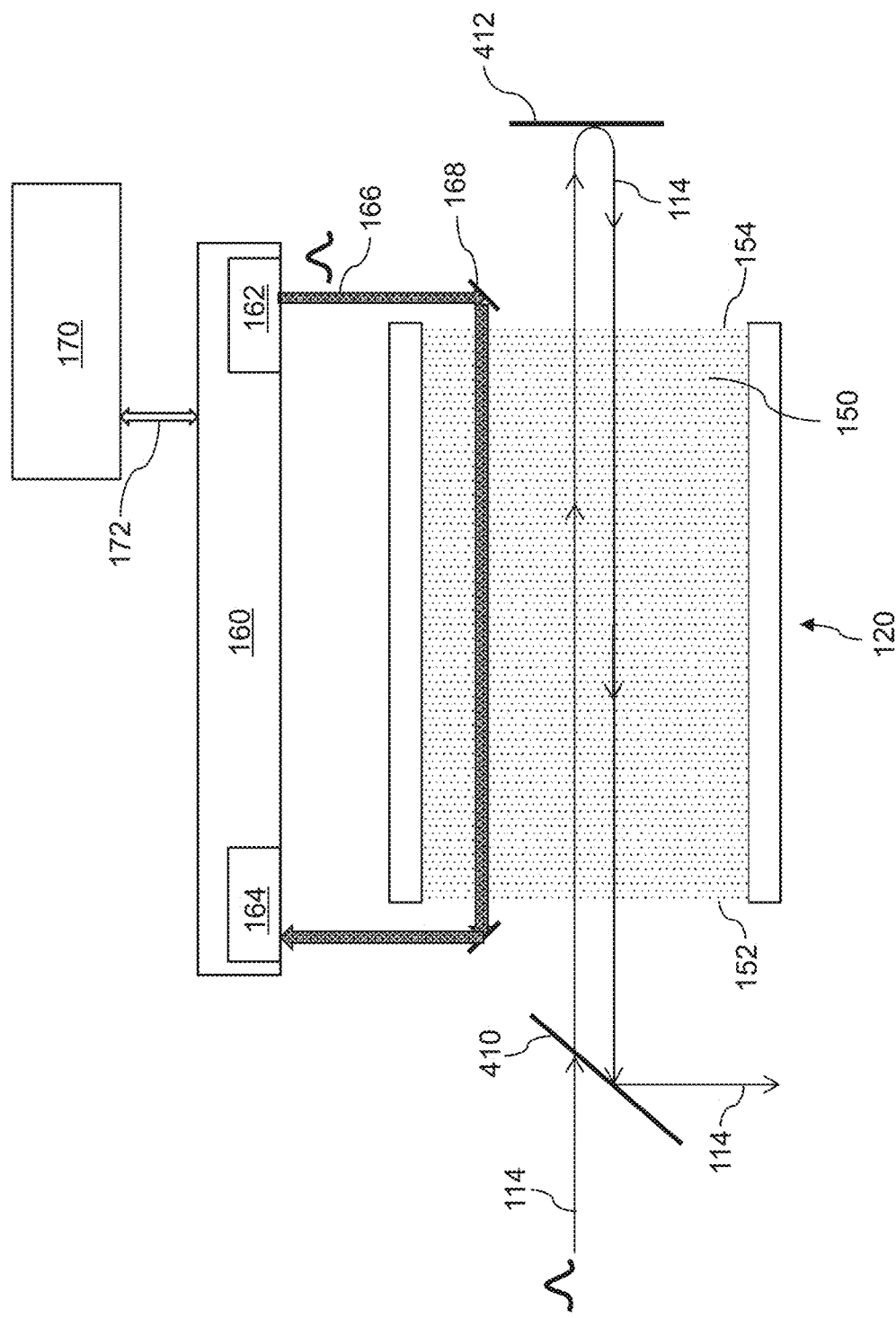

The metrology apparatus for residual gain monitoring can also be implemented together with the multi-pass amplifier configuration in the laser amplifier 112, as illustrated in FIG. 4B. The residual gain monitor 160 transmits and receives the probe laser beam 166 and measures the amount of amplification of the probe laser beam 166. In FIG. 4B, the probe laser beam 166 is offset from the laser beam 114 and passes the gain medium 150 only once. Therefore, the residual gain monitor 160 need to calculate the residual gain of a multi-pass configuration further based on the gain distribution and other characteristics of the gain medium 150. As illustrated in FIG. 3B, the probe beam may diagonally cross the laser beam 114 for dual-pass laser amplifier in FIG. 4B.

Referring to FIG. 4C, in yet another embodiment, the laser amplifier 120 has a separate set of polarization beam splitter 410' and retro-reflector 412' for the probe laser beam 166. The probe laser beam 166 has the same polarization direction as the polarization beam splitter 410', allowing it to pass the polarization beam splitter 410' toward the gain medium 150 for the first pass. The probe laser beam 166 enters the gain medium 150 from the output port 154 and exits from the input port 152. After being reflected by the retro-reflector 412', the probe laser beam 166 travels back to the gain medium 150 for the second pass with its polarization direction changed by 90°. The polarization beam splitter 410' subsequently reflects the probe laser beam 166 back to the residual gain monitor 160. In FIG. 4C, the probe laser beam 166 also has a multiple-pass as the laser beam 114, but offset from the laser beam 114. Therefore, the residual gain monitor 160 need to calculate the residual gain of a multi-pass configuration further based on the gain distribution of the gain medium 150.

Referring to FIG. 4D, the laser beam 114 and the probe beam 166 may share the polarization beam splitter 410 and the retro-reflector 412 in some embodiments. Such configuration allows the number of optical components used in the laser amplifier 120 to be reduced. The main beam path and the probe beam path may overlap or be co-axial in the illustrated embodiment. Therefore, the amount of amplification of the probe beam 166 can be approximately regarded as the residual gain of the laser amplifier 120 in a multi-pass amplifier configuration. If the probe beam is in a pulse train, the time delay between the probe beam and main beam can be scanned in a range of time period back and forth, for example, by using a probe beam delay line 183 to send the probe beam before or after the main beam at a tunable time interval. Therefore, the temporal evolution of the amplifier gain depletion can be further resolved through tomography to finely optimize the laser dynamics. For example, by adjusting the time delay between the probe beam and main beam, a curve of the amplifier gain depletion's temporal evolution can be plotted, showing different working phases of the laser amplifiers, including RF pumping phase, pump saturation phase, laser beam input and amplification phase, residual gain phase, and/or other possible phases. This curve can help fine tuning or optimizing the laser dynamics in the system.

Figure 4E:
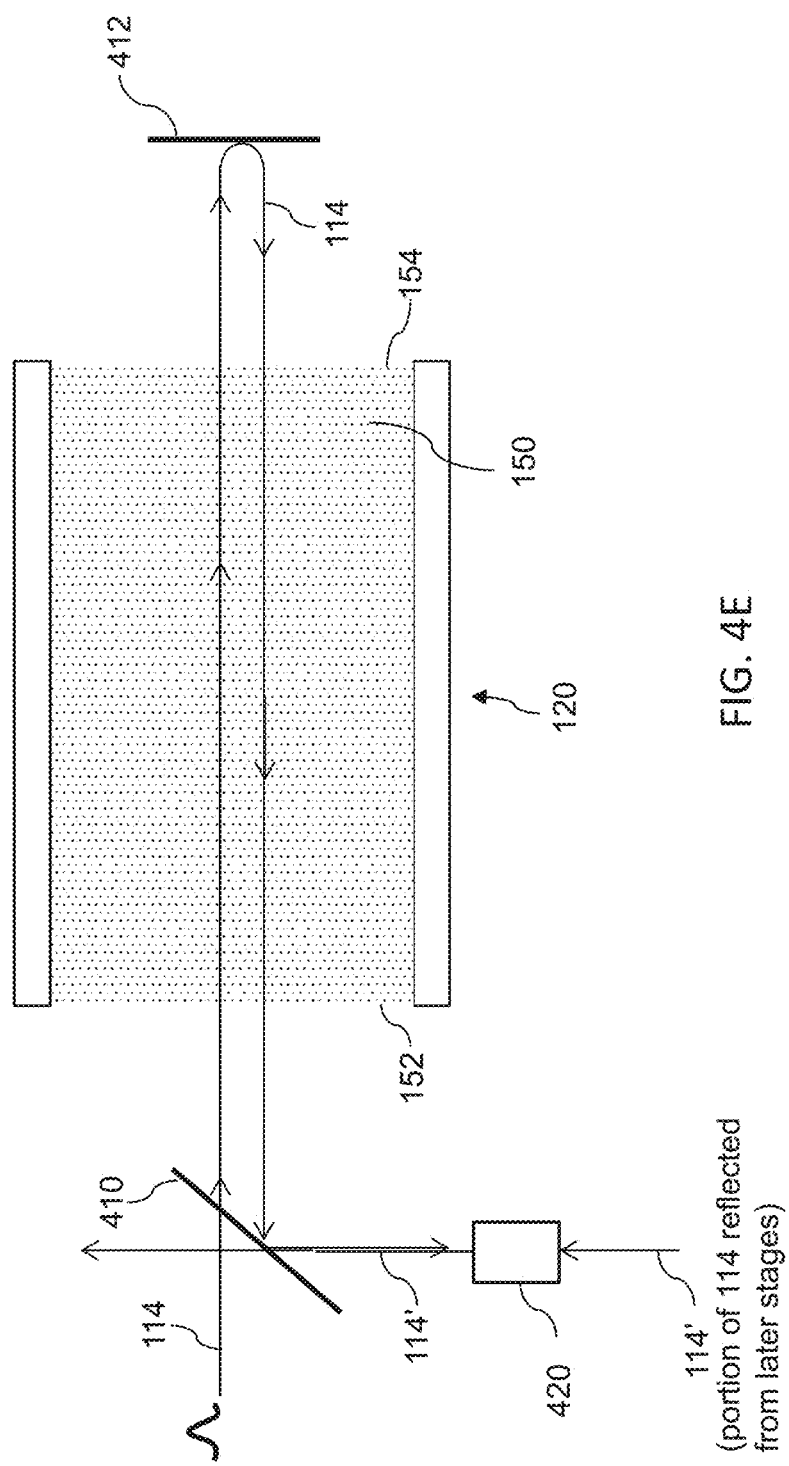

Referring to FIG. 4E, an implementation to prevent the reflected laser beam 114' from entering the laser amplifier 120 is illustrated. A polarizing element 420 is placed in the beam path of the reflected laser beam 114' before it reaches the polarization beam splitter 410. The polarizing element 420 converts the polarization of the reflected laser beam 114' to the same polarization direction as the polarization beam splitter 410 (e.g., in a horizontal direction). This allows the polarization beam splitter 410 to pass the reflected laser beam 114' without reflecting it into the gain medium 150 from the input port 152. Thus, the reflected laser beam 114' avoids amplification by the residual gain of the laser amplifier 120. The reflection beam after passing through the polarization beam splitter at the last laser amplifier may be an alternative diagnostic to purely estimate the laser-target qualification without interfered by the amplification of residual gain.

Figure 4F:
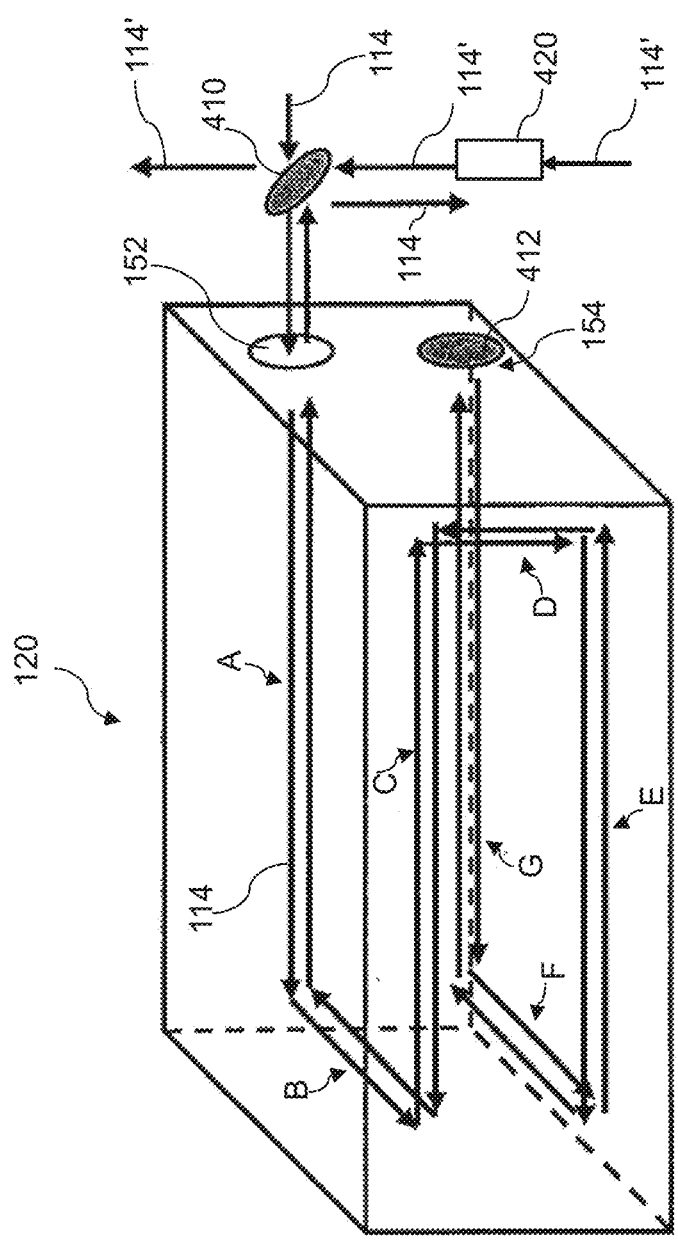

In some embodiments, the laser amplifier 120 has more than one gain medium 150, where the implementation to detour the reflected laser beam 114' as illustrated in FIG. 4E may still be adopted. FIG. 4F illustrates the laser amplifier 120 with gain medium segments A-G. Each gain medium segment may be in a tube shape, placed sequentially in a zigzag fashion for compactness. Optical components between two gain medium segments (not shown) guide the laser beam 114 to transmit from one gain medium segment to the next. Each gain medium segment may have different diameters, such as the ones illustrated in FIG. 3C. The laser beam 114 travels in the same polarization direction as the polarization beam splitter 410 and enters the gain medium segments from the input port 152. The laser beam 114 is amplified sequentially by the gain medium segments A-G in a first pass. A retro-reflector 412 is placed at the output port 154 and reflects the laser beam 114 back to the gain medium segments for a second pass. The retro-reflector 412 also changes the polarization of the laser beam 412 by 90°. After the laser beam 412 is amplified sequentially by the gain medium segments G-A in the second pass and leaves the input port 152, the polarization beam splitter 410 reflects the laser beam 412 to the next stage, such as the next laser amplifier or the EUV vessel 116 (FIG. 1). The reflected laser beam 114' from the EUV vessel 116 travels backward in the main beam path. Before the reflected laser beam 114' reaches the polarization beam splitter 410, the polarizing element 420 adjust the polarization of the reflected laser beam 114' to be the same as the polarization beam splitter 410. Afterwards, the reflected laser beam 114' passes through the polarization beam splitter 410, bypassing the laser amplifier 120 without being amplified by the residual gain.

Figure 5:
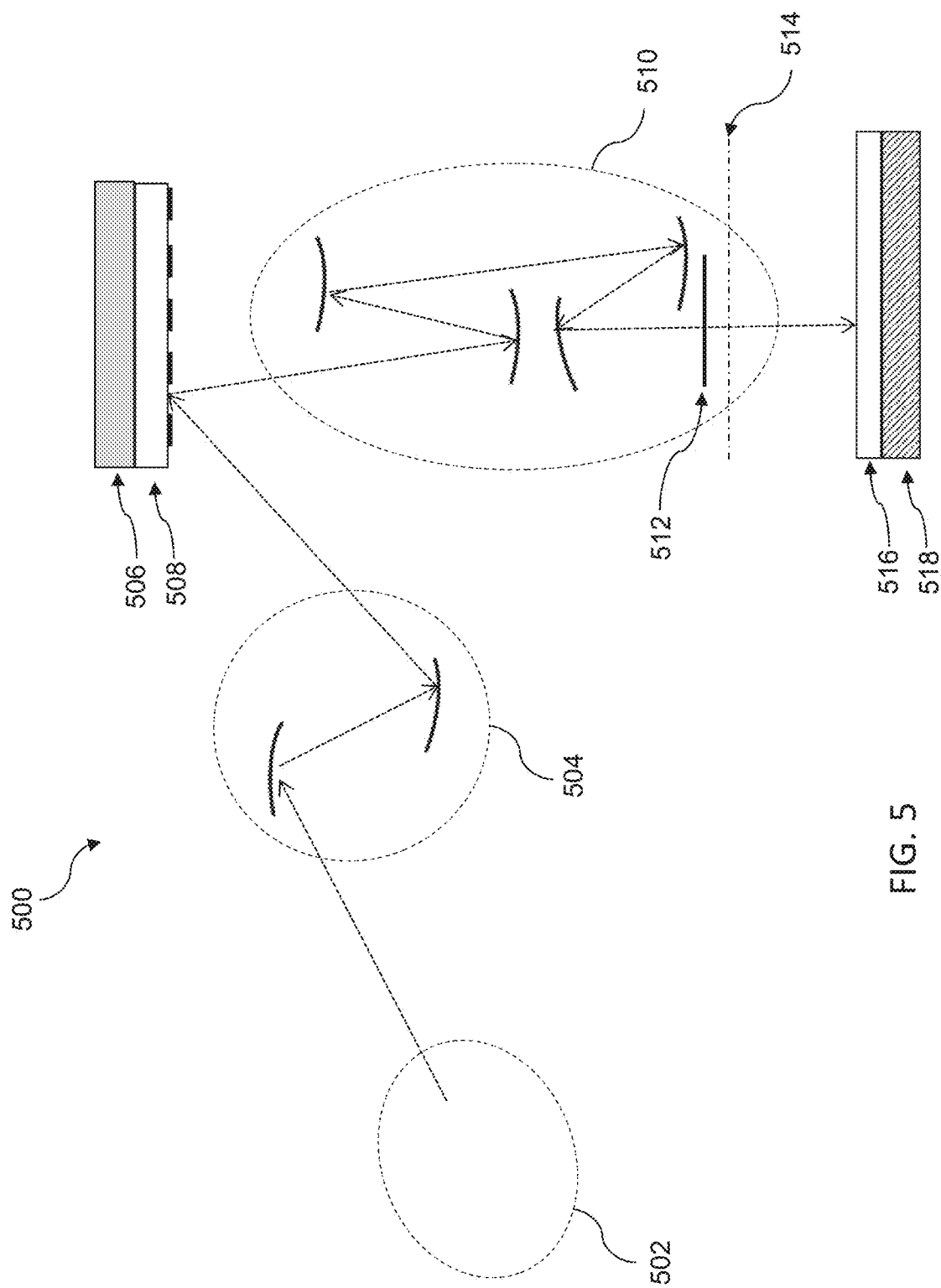
FIG. 5 is a schematic view of a lithography system, in accordance with some embodiments.

As previously noted, the EUV vessel described above may be used to provide an EUV light source for a lithography system. By way of illustration, and with reference to FIG. 5, provided therein is a schematic view of an exemplary lithography system 500, in accordance with some embodiments. The lithography system 500 may also be generically referred to as a scanner that is operable to perform lithographic processes including exposure with a respective radiation source and in a particular exposure mode. In at least some of the present embodiments, the lithography system 500 includes an extreme ultraviolet (EUV) lithography system designed to expose a resist layer by EUV light. In various embodiments, the resist layer includes a material sensitive to the EUV light (e.g., an EUV resist). The lithography system 500 of FIG. 5 includes a plurality of subsystems such as a radiation source 502, an illuminator 504, a mask stage 506 configured to receive a mask 508, projection optics 510, and a substrate stage 518 configured to receive a semiconductor substrate 516. A general description of the operation of the lithography system 500 may be given as follows: EUV light from the radiation source 502 is directed toward the illuminator 504 (which includes a set of reflective mirrors) and projected onto the reflective mask 508. A reflected mask image is directed toward the projection optics 510, which focuses the EUV light and projects the EUV light onto the semiconductor substrate 516 to expose an EUV resist layer deposited thereupon. Additionally, in various examples, each subsystem of the lithography system 500 may be housed in, and thus operate within, a high-vacuum environment, for example, to reduce atmospheric absorption of EUV light.

In the embodiments described herein, the radiation source 502 may be used to generate the EUV light. As discussed above, the source may generate the EUV light using a laser produced plasma (LPP). In some examples, the EUV light may include light having a wavelength ranging from about 1 nm to about 100 nm. In one particular example, the radiation source 502 generates EUV light with a wavelength centered at about 13.5 nm. Accordingly, the radiation source 502 may also be referred to as an EUV radiation source 502. In some embodiments, the radiation source 502 also includes a collector, which may be used to collect EUV light generated from the plasma source and to direct the EUV light toward imaging optics such as the illuminator 504.

Upon receipt, light from the radiation source 502 is directed toward the illuminator 504. In some embodiments, the illuminator 504 may include reflective optics (e.g., for the EUV lithography system 500), such as a single mirror or a mirror system having multiple mirrors in order to direct light from the radiation source 502 onto the mask stage 506, and particularly to the mask 508 secured on the mask stage 506. In some examples, the illuminator 504 may include a zone plate, for example, to improve focus of the EUV light. In some embodiments, the illuminator 504 may be configured to shape the EUV light passing therethrough in accordance with a particular pupil shape, and including for example, a dipole shape, a quadrapole shape, an annular shape, a single beam shape, a multiple beam shape, and/or a combination thereof. In some embodiments, the illuminator 504 is operable to configure the mirrors (i.e., of the illuminator 504) to provide a desired illumination to the mask 508. In one example, the mirrors of the illuminator 504 are configurable to reflect EUV light to different illumination positions. In some embodiments, a stage prior to the illuminator 504 may additionally include other configurable mirrors that may be used to direct the EUV light to different illumination positions within the mirrors of the illuminator 504. In some embodiments, the illuminator 504 is configured to provide an on-axis illumination (ONI) to the mask 508. In some embodiments, the illuminator 504 is configured to provide an off-axis illumination (OAI) to the mask 508. It should be noted that the optics employed in the EUV lithography system 500, and in particular optics used for the illuminator 504 and the projection optics 510, may include mirrors having multilayer thin-film coatings known as Bragg reflectors. By way of example, such a multilayer thin-film coating may include alternating layers of Mo and Si, which provides for high reflectivity at EUV wavelengths (e.g., about 13 nm).

As discussed above, the lithography system 500 also includes the mask stage 506 configured to secure the mask 508. Since the lithography system 500 may be housed in, and thus operate within, a high-vacuum environment, the mask stage 506 may include an electrostatic chuck (e-chuck) to secure the mask 508. As with the optics of the EUV lithography system 500, the mask 508 is also reflective. As illustrated in the example of FIG. 5, light is reflected from the mask 508 and directed towards the projection optics 510, which collects the EUV light reflected from the mask 508. By way of example, the EUV light collected by the projection optics 510 (reflected from the mask 508) carries an image of the pattern defined by the mask 508. In various embodiments, the projection optics 510 provides for imaging the pattern of the mask 508 onto the semiconductor substrate 516 secured on the substrate stage 518 of the lithography system 500. In particular, in various embodiments, the projection optics 510 focuses the collected EUV light and projects the EUV light onto the semiconductor substrate 516 to expose an EUV resist layer deposited on the semiconductor substrate 516. As described above, the projection optics 510 may include reflective optics, as used in EUV lithography systems such as the lithography system 500. In some embodiments, the illuminator 504 and the projection optics 510 are collectively referred to as an optical module of the lithography system 500.

In some embodiments, the lithography system 500 also includes a pupil phase modulator 512 to modulate an optical phase of the EUV light directed from the mask 508, such that the light has a phase distribution along a projection pupil plane 514. In some embodiments, the pupil phase modulator 512 includes a mechanism to tune the reflective mirrors of the projection optics 510 for phase modulation. For example, in some embodiments, the mirrors of the projection optics 510 are configurable to reflect the EUV light through the pupil phase modulator 512, thereby modulating the phase of the light through the projection optics 510. In some embodiments, the pupil phase modulator 512 utilizes a pupil filter placed on the projection pupil plane 514. By way of example, the pupil filter may be employed to filter out specific spatial frequency components of the EUV light reflected from the mask 508. In some embodiments, the pupil filter may serve as a phase pupil filter that modulates the phase distribution of the light directed through the projection optics 510.

As discussed above, the lithography system 500 also includes the substrate stage 518 to secure the semiconductor substrate 516 to be patterned. In various embodiments, the semiconductor substrate 516 includes a semiconductor wafer, such as a silicon wafer, germanium wafer, silicon-germanium wafer, III-V wafer, or other type of wafer as described above or as known in the art. The semiconductor substrate 516 may be coated with a resist layer (e.g., an EUV resist layer) sensitive to EUV light. EUV resists may have stringent performance standards. In the embodiments described herein, the various subsystems of the lithography system 500, including those described above, are integrated and are operable to perform lithography exposing processes including EUV lithography processes. The lithography system 500 may further include other modules or subsystems which may be integrated with (or be coupled to) one or more of the subsystems or components described herein.

The EUV light system 100 (FIG. 1) may be used as the source 502 or provide the EUV radiation to the source 502 for use by the lithography system 500. That is, the system 100 provides the EUV radiation at which point it is transferred to the systems described in the lithography system 500.

FIG. 6 is a flow chart of a method 600 for residual gain monitoring in a laser system according to various aspects of the present disclosure. The method 600 is merely an example, and is not intended to limit the present disclosure beyond what is explicitly recited in the claims. Additional steps can be provided before, during, and after the method 600, and some of the steps described can be replaced, relocated, or eliminated for other embodiments of the method 600. The method 600 is described below in conjunction with FIGS. 3A-3B.

At operation 602, the method 600 generates a laser beam 114 (FIG. 3A) in a laser source 118. The laser beam 114 may be a series of pulses. At operation 604, the method 600 passes the laser beam 114 through a laser amplifier 120 along a main beam path. At operation 606, the method 600 generates a probe laser beam 166 in a residual gain monitor 160. The probe laser beam 166 has a pulse energy and average power level much less than the corresponding amplifier saturation energy and power. The probe laser beam 166 has a power level much less than the laser beam 114. At operation 608, the method 600 passes the probe laser beam through the laser amplifier 120 along a probe beam path, wherein the probe beam path can be switched by rotating the probe beam input reflectors to become offset from the main beam path (FIG. 3A) or diagonally overlaps with the main beam path (FIG. 3B). At operation 610, the method 600 calculate a residual gain of the laser amplifier based on the strengths of the probe laser beam 166 before and after being amplified by the laser amplifier. The operation 610 may further include sending the residual gain information to a control module 170 for adjusting parameters of the laser system. The method 600 may optionally have an operation 612. The operation 612 includes adjusting the time delay between the laser pulse and probe pulse, for example through the probe beam delay line 183 as illustrated in FIG. 4D. The temporal evolution of the amplifier gain depletion can therefore be further resolved through tomography to finely optimize the laser dynamics in the system.

The various embodiments described herein offer several advantages over the existing art. It will be understood that not all advantages have been necessarily discussed herein, no particular advantage is required for all embodiments, and other embodiments may offer different advantages. For example, embodiments discussed herein provide a metrology apparatus and methods thereof for residual gain monitoring and reduction in a laser system, which reduces heat dissipation and optical component damages in a EUV lithography production flow. Furthermore, various embodiments of the present disclosure can be implemented with low complexity and low manufacturing cost.

In one exemplary aspect, the present disclosure is directed to a system. The system includes a laser source operable to provide a laser beam; a laser amplifier having an input port and an output port and operable to amplify the laser beam, the laser beam travelling along a main beam path through the laser amplifier from the input port to the output port; and a residual gain monitor operable to provide a probe laser beam, the probe laser beam travelling along a probe beam path through the laser amplifier from the output port to the input port and returning to the residual gain monitor, wherein the residual gain monitor is operable to calculate a residual gain of the laser amplifier using the probe laser beam. In an embodiment, the system further includes an extreme ultraviolet (EUV) vessel operable to receive the laser beam after travelling through the laser amplifier for interaction with a target to create EUV light. In an embodiment, the system further includes a probe laser beam delay line, wherein the probe laser beam delay line is configured to adjust a time interval between when the laser beam and the probe laser beam entering the laser amplifier. In an embodiment, the probe beam path is offset from the main beam path in the laser amplifier; and the probe laser beam travels through the laser amplifier in parallel with the laser beam. In an embodiment, the probe beam path overlaps with the main beam path in the laser amplifier in a diagonal direction; and the probe laser beam travels through the laser amplifier during a period when there is no laser beam in the laser amplifier. In an embodiment, a portion of the laser beam is reflected after having passed the laser amplifier, resulting in a reflected laser beam; and the probe laser beam travels through the laser amplifier before the reflected laser beam enters the laser amplifier. In an embodiment, a power level of the probe laser beam before the probe laser beam enters the laser amplifier is in a range from about $10^{-9}$ to about $10^{-6}$ of a power level of the laser beam before the laser beam enters the laser amplifier. In an embodiment, the system further includes a reflecting component allowing the laser beam to travel through the laser amplifier more than once. In an embodiment, the reflecting component also allows the probe laser beam to travel through the laser amplifier more than once. In an embodiment, wherein the reflecting component changes a polarization direction of the laser beam by 90°.

In another exemplary aspect, the present disclosure is directed to a system. The system includes a laser source generating a laser pulse, the laser pulse traveling along a laser path; an extreme ultraviolet (EUV) vessel receiving the laser pulse for creating EUV light and reflecting a portion of the laser pulse as a reflected laser pulse; a first gain medium located between the laser source and the EUV vessel along the laser path; a second gain medium located between the first gain medium and the EUV vessel along the laser path, wherein the reflected laser pulse travels through the second gain medium and the first gain medium along the laser path; a first residual gain monitoring module generating a first probe laser pulse, the first probe laser pulse traveling through the first gain medium along a first probe path, the first residual gain monitoring module generating a first residual gain data according to the first probe laser pulse; a second residual gain monitoring module generating a second probe laser pulse, the second probe laser pulse traveling through the second gain medium along a second probe path, the second residual gain monitoring module generating a second residual gain data according to the second probe laser pulse; and a control module coupled to the first and second residual gain monitoring modules to receive the first and second residual gain data and adjusting parameters of the first and second gain mediums accordingly. In an embodiment, the first probe path overlaps with the laser path in the first gain medium; and the second probe path overlaps with the laser path in the second gain medium. In an embodiment, the first probe laser pulse travels through the first gain medium during an interval after the laser pulse leaves the first gain medium and before the reflected laser pulse enters the first gain medium; and the second probe pulse travels through the second gain medium during an interval after the laser pulse leaves the second gain medium and before the reflected laser pulse enters the second gain medium. In an embodiment, the first probe path is offset from the laser path in the first gain medium; and the second probe path is offset from the laser path in the second gain medium. In an embodiment, wherein the second gain medium has a cross-sectional area perpendicular to the laser path larger than that of the first gain medium, the system further includes a beam shaping component located between the first gain medium and the second gain medium, the beam shaping component enlarging a cross-sectional area of the laser pulse. In an embodiment, the laser pulse travels through the first gain medium more than once before entering the second gain medium. In an embodiment, parameters of the first and second gain mediums include RF power, mixture gas pressure, mixture gas ratio, or a combination thereof.

In yet another exemplary aspect, the present disclosure is directed to a method. The method includes generating a laser beam in a laser source; passing the laser beam through a laser amplifier along a main beam path, such that the laser beam is amplified, the laser beam exiting the laser amplifier from a terminal of the laser amplifier; generating a probe laser beam in a residual gain monitor; passing the probe laser beam through the laser amplifier along a probe beam path, such that the probe laser beam is amplified, the probe laser beam entering the laser amplifier from the terminal of the laser amplifier; and calculating a residual gain of the laser amplifier based on strengths of the probe laser beam before and after being amplified. In an embodiment, the probe beam path is offset from the main beam path in the laser amplifier, the passing of the probe laser beam through the laser amplifier includes passing the probe laser beam through the laser amplifier simultaneously with the passing of the laser beam through the laser amplifier. In an embodiment, the probe beam path overlaps with the main beam path in the laser amplifier, the passing of the probe laser beam through the laser amplifier includes passing the probe laser beam through the laser amplifier during a period when the laser beam is not in the laser amplifier.

In yet another exemplary aspect, the present disclosure is directed to a laser system. The laser system includes a laser source configured to generate a first laser beam; a laser amplifier configured to amplify the first laser beam; a reflector configured to reflect the first laser beam back to the laser amplifier to become a second laser beam, wherein polarization directions of the first and second laser beams differ by 90°; and a polarization beam splitter located between the laser source and the laser amplifier, the polarization beam splitter passing the first laser beam and reflecting the second laser beam. In an embodiment, the laser system further includes an extreme ultraviolet (EUV) vessel configured to receive the second laser beam reflected from the polarization beam splitter, wherein a portion of the second laser beam is reflected from a droplet in the EUV vessel to become a third laser beam, the third laser beam traveling back to the polarization beam splitter, wherein the polarization beam splitter substantially fully passes the third laser beam. In an embodiment, the first laser beam passes the polarization beam splitter in a first direction; and the third laser beam passes the polarization beam splitter in a second direction perpendicular to the first direction. In an embodiment, a residual gain monitor configured to generate a probe laser beam, the probe laser beam traveling through the laser amplifier. In an embodiment, the residual gain monitor calculates a residual gain of the laser amplifier according to strengths of the probe laser beam before and after traveling through the laser amplifier.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   generating a probe beam in a residual gain monitor;
   amplifying the probe beam through a laser amplifier;
   calculating a residual gain of the laser amplifier based on strengths of the probe beam before and after the amplifying; and adjusting parameters of the laser amplifier according to a comparison between the residual gain and a threshold level.

2. The method of claim 1, further comprising:
generating a laser beam in a laser source;
amplifying the laser beam through the laser amplifier; and
communicating the residual gain to a control module,
wherein the adjusting of the parameters is conducted at the control module.

3. The method of claim 2, wherein the amplifying of the probe beam includes amplifying the probe beam along a probe path, and the amplifying of the laser beam includes amplifying the laser beam along a main path, wherein the probe path is offset from the main path.

4. The method of claim 2, wherein the amplifying of the probe beam includes amplifying the probe beam at a first time period, the amplifying of the laser beam includes amplifying the laser beam at a second time period, and the first time period is offset from the second time period.

5. The method of claim 2, wherein the generating of the probe beam includes generating the probe beam at a first power level, and the generating of the laser beam includes generating the laser beam at a second power level, and the first power level is about 10-9 to about 10-6 of the second power level.

6. The method of claim 1, wherein the generating of the probe beam includes generating the probe beam by a pulsed laser.

7. The method of claim 1, wherein the generating of the probe beam includes generating the probe beam by a continuous laser.

8. The method of claim 1, wherein the laser amplifier is a first laser amplifier, the method further comprising amplifying the probe beam through a second laser amplifier.

9. A method, comprising:
generating a laser pulse in a laser source;
amplifying the laser pulse along a laser path through a gain medium;
generating a probe pulse in a residual gain monitor;
amplifying the probe pulse along a probe path through the gain medium, the probe path being offset from the laser path; and
calculating a residual gain of the gain medium based on a change in strength of the probe pulse after being amplified; and
adjusting parameters of the amplifying according to a comparison between the residual gain and a threshold level.

10. The method of claim 9, further comprising passing the amplified laser pulse into an extreme ultraviolet (EUV) vessel for interaction with a target to create EUV light.

11. The method of claim 9, further comprising sending the residual gain to a control module coupled to a laser system, the laser system including the laser source and the gain medium.

12. The method of claim 9, wherein the adjusting of the parameters of the amplifying includes adjusting a RF power, a mixture gas pressure, a mixture gas ratio, or a combination thereof.

13. The method of claim 9, wherein the amplifying of the probe pulse includes passing the probe pulse along the probe path more than once.

14. The method of claim 9, wherein the amplifying of the probe pulse includes passing the probe pulse through a beam splitter.

15. The method of claim 9, the amplifying of the probe pulse includes amplifying the probe pulse during a time when the laser pulse is not amplified.

16. A system, comprising:
a laser amplifier having a gain medium;
a laser source operable to provide a laser beam through the gain medium;
a residual gain monitor operable to provide a probe beam through the gain medium and to derive a residual gain of the laser amplifier from the probe beam; and
a control module operable to respond to the residual gain.

17. The system of claim 16, wherein the control module is configured to adjust the gain medium based on the residual gain.

18. The system of claim 16, wherein the gain medium is a first gain medium, the probe beam is a first probe beam, the residual gain monitor is a first residual gain monitor, and the residual gain is a first residual gain,
wherein the laser amplifier includes a second gain medium, and
the system further comprising a second residual gain monitor operable to provide a second probe beam and to derive a second residual gain of the laser amplifier,
wherein the control module is further operable to respond to the second residual gain.

19. The system of claim 18, wherein the first gain medium and the second gain medium have different profiles.

20. The system of claim 16, further comprising a reflecting component operable to allow the laser beam to pass through the gain medium more than once.

* * * * *